(12) United States Patent
  Lang

(10) Patent No.: US 9,428,110 B2
(45) Date of Patent: Aug. 30, 2016

(54) VISUAL SYSTEM FOR A VEHICLE

(71) Applicant: Werner Jürgen Lang, Ergersheim (DE)

(72) Inventor: Werner Jürgen Lang, Ergersheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 14/493,977

(22) Filed: Sep. 23, 2014

(65) Prior Publication Data

US 2015/0085125 A1   Mar. 26, 2015

(30) Foreign Application Priority Data

Sep. 24, 2013   (DE) .................. 10 2013 015 847

(51) Int. Cl.
  *B60Q 9/00*   (2006.01)
  *B60R 1/00*   (2006.01)
  *G06K 9/00*   (2006.01)

(52) U.S. Cl.
  CPC ............... *B60Q 9/005* (2013.01); *B60R 1/00* (2013.01); *B60R 1/002* (2013.01); *G06K 9/00791* (2013.01); *B60R 2300/108* (2013.01); *B60R 2300/303* (2013.01)

(58) Field of Classification Search
  None
  See application file for complete search history.

(56) References Cited

U.S. PATENT DOCUMENTS

| | | | |
|---|---|---|---|
| 6,259,359 B1* | 7/2001 | Fujinami | B60R 1/00 340/435 |
| 7,671,851 B1* | 3/2010 | Pryor | B60K 35/00 345/173 |
| 2005/0249379 A1 | 11/2005 | Yoshimura | |
| 2006/0232672 A1* | 10/2006 | Sim | B60R 11/0235 348/148 |
| 2009/0010567 A1 | 1/2009 | Akiba et al. | |
| 2010/0100321 A1* | 4/2010 | Koenig | G01C 21/005 701/472 |
| 2010/0201818 A1* | 8/2010 | Imanishi | B60R 1/00 348/148 |
| 2010/0225762 A1 | 9/2010 | Augst | |
| 2010/0245575 A1* | 9/2010 | Mori | B60R 1/00 348/148 |
| 2011/0013021 A1* | 1/2011 | Hongo | B60R 1/00 348/148 |

(Continued)

FOREIGN PATENT DOCUMENTS

| | | |
|---|---|---|
| DE | 100 17 072 | 10/2000 |
| DE | 10 2006 032 553 | 1/2008 |

(Continued)

*Primary Examiner* — Geepy Pe
*Assistant Examiner* — Tyler W Sullivan
(74) *Attorney, Agent, or Firm* — Cozen O'Connor

(57) ABSTRACT

A visual system (50) for a vehicle, having a capturing unit on the vehicle. The capturing unit is provided with at least a capturing device (52), a calculation unit (58), and a display unit (60). The capturing device (52) is adapted to acquire a capturing region (21, 22, 23) behind the vehicle (10). The capturing region including a substantially undistorted, backward-directed capturing region (21) behind the vehicle and a substantially downward-directed capturing portion (22) behind the vehicle. The visual system (50) is adapted to extract from the capturing portion (21, 22, 23) a first image (62), which corresponds to the undistorted capturing portion (21), and a second image (63), which corresponds to the downward-directed capturing portion, and to display the first image (61) in an upper image portion (64) and the second image (62) in a lower image portion (66) of the display unit (60).

13 Claims, 1 Drawing Sheet

(56) References Cited

U.S. PATENT DOCUMENTS

| | | | |
|---|---|---|---|
| 2011/0267366 A1* | 11/2011 | Ichinose | B60R 1/00 345/625 |
| 2012/0274737 A1 | 11/2012 | Kuboyama et al. | |
| 2013/0222593 A1* | 8/2013 | Byrne | G60T 3/005 348/148 |
| 2014/0132707 A1* | 5/2014 | Hashimoto | G01C 3/06 348/36 |
| 2014/0247358 A1* | 9/2014 | Takeda | G06T 5/006 348/148 |
| 2014/0277940 A1* | 9/2014 | VanVuuren | B60R 1/00 701/36 |
| 2014/0347489 A1* | 11/2014 | Kumon | B60R 1/00 348/148 |

FOREIGN PATENT DOCUMENTS

| | | |
|---|---|---|
| DE | 10 2008 029 916 | 1/2009 |
| DE | 10 2007 044 535 | 3/2009 |
| DE | 10 2012 005 277 | 7/2013 |
| EP | 2 623 374 | 8/2013 |
| JP | 2000-134608 | 5/2000 |
| JP | 2005-311868 | 11/2005 |
| JP | 2008-301091 | 12/2008 |
| JP | 2012-023658 | 2/2012 |
| JP | 2012-162212 | 8/2012 |
| JP | 2013-154869 | 8/2013 |
| KR | 2002 000 9711 | 2/2002 |
| WO | WO 2014/094941 | 6/2014 |

* cited by examiner

VISUAL SYSTEM FOR A VEHICLE

BACKGROUND OF THE INVENTION

1. Field of the Invention

The present invention relates to a visual system for a vehicle, in particular a commercial vehicle or a van, or a vehicle where a direct or indirect view of the region behind the vehicle through a rear window of the vehicle by means of a mirror is impossible.

2. Description of the Related Art

DE 100 17 072 A1 relates to a vehicle rear view monitoring system, in particular a rear view monitoring system for detecting another vehicle, which approaches the driver's own vehicle during a driving operation of the vehicle, by means of an image captured by a camera that is mounted in/to the vehicle, and for outputting a warning signal to the driver.

In motor vehicles comprising a rear window, it is common to provide an inside rear mirror by means of which a driver seated on the driver's seat may view the area behind the vehicle without having to turn around. In case he wishes a direct view, e.g. when driving in reverse direction, this is also possible by looking through the rear window.

Also for commercial vehicles or vans, or for vehicles that are not provided with a rear window, or where the rear window is temporarily obstructed, so that a direct view of the region behind the vehicle is impossible, an optimum view of the region behind the vehicle is desirable for reasons of safety. As the view through the rear portion of the vehicle is obstructed or impossible, mirrors are usually provided on the side of the vehicle so as to allow for a best possible view of the region behind the vehicle.

The indirect view of the region behind the vehicle by means of exterior mirrors is, however, often insufficient in commercial vehicles or vehicles without rear window, and blind spots exist. On the other hand, particularly when reversing or when driving a commercial vehicle towards a loading ramp or the like, or during (reverse) parking operations with a vehicle that is not provided with a rear window, it is desirable, not only for reasons of safety but also for efficient handling of the loading and unloading or of a parking operation, for enabling the driver a good view of the region behind the vehicle at any time, even when the driver is seated on the driver's seat in a normal position, in order to facilitate reverse driving and in order to allow the driver an optimum view of the region behind the vehicle, so that he may, for example, reliably recognize possible obstacles in this region.

In order to provide an optimum view of the region behind the vehicle, for example a divided exterior mirror is used in vehicles where no direct view through the rear portion is possible; in this divided exterior mirror, besides the usual exterior rear view mirror, a second mirror or mirror segment serves for observing the so-called blind spot region. These mirrors are usually smaller and often only allow for viewing a comparatively small portion of the blind spot. Moreover, as it is a wide-angle mirror, this mirror often has larger curvature, which results in a distorted image compared to the common exterior mirror and makes it difficult for an inexperienced driver to correctly estimate distances or relative positions of possible obstacles in the depicted region, or to recognize obstacles.

Thus, rear-view camera systems are known by means of which the region behind the vehicle is captured and displayed to the driver of a vehicle on a display unit. Here, also the blind spot region behind the vehicle can be covered.

Such rear-view camera system is, for example, disclosed in DE 10 2012 005 277 B3. The vehicle rear-end visual system described in DE 10 2012 005 277 B3 comprises a capturing unit that is adapted to acquire images of a region behind the vehicle. The rear-end system further comprises an image processing unit, where the image captured by the capturing unit is superimposed with a vehicle reference so that a virtual image overlaid with a vehicle reference is generated and displayed in the driver's compartment of the vehicle by means of a display unit.

Rear-view camera systems as known from the prior art are usually designed for viewing the close range behind the vehicle and their resolution and image portion usually does not allow for estimating the distance and speed of distant vehicles or to depict them at all.

Thus, it is an object of the invention to provide a visual system for a vehicle, wherein the region behind the vehicle, which region is relevant for the respective driving situation, is visible in all driving situations like, e.g. forward travel or reverse travel.

In the description of the present invention, all information about direction relate to a motor vehicle that is moving forward. In sideward direction thus means the direction along the vertical direction with regard to a direction vector for forward driving of the vehicle, and corresponds to the left-right-direction.

SUMMARY OF THE INVENTION

The above object is solved by a visual system for a vehicle comprising the features of claim 1.

The visual system comprises a capturing unit attached to the vehicle and provided with at least a capturing device, a calculation unit and a display unit, wherein the capturing device is adapted to acquire a capturing region behind the vehicle, the capturing region including a substantially undistorted, backward-directed capturing region behind the vehicle, and a substantially downward-directed capturing region behind the vehicle. Here, the visual system is adapted to extract a first image from the capturing region, which image corresponds to the undistorted capturing region, and to extract a second image, which corresponds to the downward-directed capturing region, and to display the first image in an upper image portion and the second image in a lower image portion of the display unit. The image portions may be displayed separately or with a transition between the two image portions.

The acquisition of a backward-directed capturing region behind the vehicle and a substantially downward-directed capturing region behind the vehicle, and displaying the extracted images of the backward-directed capturing region and the downward-directed capturing region in a display unit gives the driver—even in a vehicle where no direct view through the rear of the vehicle is possible—the impression of a familiar view comparable to the view through the rear window of a vehicle and, at the same time, enables the driver to view the region immediately behind the vehicle, i.e. the close range region behind the vehicle. The display is easily comprehensible for the driver, in particular due to the display of the extracted regions, and it enables the driver to both to correctly estimate the distance and speed of distant vehicles approaching from behind and to estimate distances with regard to other vehicles or obstacles, e.g. during parking maneuvers.

Hence, the invention is based on the idea to provide the driver with an illustration of the region behind the vehicle by means of display of the extracted regions in a display unit, which illustration he will readily understand, by capturing and extracting both a (horizontal) backward-directed capturing region behind the vehicle and a downward-directed capturing region behind the vehicle. Further, only those regions that are really relevant for the respective driving situations are illustrated, i.e. the close range immediately behind the vehicle in case of reversing, and the backward-directed horizon viewing portion in case of driving forward. The close up range may extend for example maximally up to 10 m behind the vehicle, e.g. up to 7 m behind the vehicle, while the backward-directed horizon viewing portion begins at a distance of more than 10 m, e.g. 15 m behind the vehicle. This means that a region between the two regions to be illustrated, which region is neither relevant for forward driving nor for reversing, is not illustrated or displayed as a transition, so that the driver is not confused by unnecessary information.

Advantageous embodiments are specified in the dependent claims.

In an advantageous embodiment, the backward-directed capturing region corresponds to a horizon view. Hence, the capturing region and the correspondingly extracted and displayed first image correspond to the region a driver may usually view through an inside rear view mirror in vehicles where the view through the rear end of the vehicle is not obscured.

In an advantageous embodiment, the capturing device comprises, e.g. a camera, a lens. Usually, distortions are stronger toward the respective image edges. By extracting the first image from the undistorted, backward-directed capturing portion, an undistorted image that corresponds to the long distance vision up to the horizon is provided for the driver. This allows for a sharp image, and an estimation regarding the distance and speed of vehicles is advantageously improved for the driver.

In an advantageous embodiment, the capturing device comprises an aspherical lens. An aspherical lens is a lens whose optically effective form deviates from the spherical form, so that imaging errors may be avoided due to the larger number of parameters. In particular, spherical aberration may be corrected, i.e. distortions that increase towards the image edges. If, according to claim 1, the capturing device acquires a substantially undistorted, backward-directed capturing region, spherical aberrations result, inter alia, in the downward-directed capturing region. By using the aspherical lens, a substantially undistorted image, in particular in the downward-directed region, is acquired and displayed, so that, e.g. the distance with respect to other vehicles, e.g. during parking operations, may be correctly estimated.

In advantageous embodiments, the capturing device is a camera, possibly with a wide-angle configuration, or another image sensor, which preferably permanently, i.e. at least when ignition of the vehicle is started, and continuously captures images and supplies them to the calculation unit in the vehicle, which calculating unit then converts the received data in order to display the first image in an upper image portion and the second image in a lower image portion of the display unit, and to display a transition where appropriate. The depiction on the display unit is preferably also effected permanently and in real-time.

In an advantageous embodiment, the backward-directed region substantially corresponds to the depiction on an inside mirror. This has the advantage that the driver is provided with a familiar view of the horizon region behind the vehicle, which he will readily and intuitively understand.

In the advantageous embodiment, the display unit, e.g. a display or a projection device, is arranged in the area of a conventional inside rear view mirror of the vehicle. This position corresponds to the position of an inside rear view mirror of the vehicle, to which a driver is used to, i.e. the display unit is arranged such inside the vehicle that it is positioned in the height of the Frankfurt horizontal plane (German horizontal plane) or higher for the $95^{th}$ percentile with regard to the eye level of a seated person within the vehicle, taking into account different seating positions of the driver. The Frankfurt horizontal plane is the virtual line that connects the highest point of the human ear with the inferior margin of the orbit.

According to a preferred embodiment, the calculation unit extracts the first and second images from the acquisition of the capturing device. Hence, not additional device, and thus no further space, is required within the vehicle. The calculation unit may be formed as a separate unit, implemented by an on-board computer, or may be integrated in the display unit or the capturing unit.

According to a preferred embodiment, the visual system is adapted to adjust the size of the depicted upper and lower image portions on the display unit dynamically dependent on the driving situation. Dynamic adjustment may be effected both dependent of the driving speed and dependent of the driving direction, i.e. forward-travel or reversing. Thus, it is possible, for example during forward driving and/or at high driving speed, to display the upper image portion, which renders the substantially backward-directed capturing region (horizon view), larger than the lower image portion, which renders the downward-directed capturing region, and which is of minor importance for steering the vehicle during forward driving and, in particular, at high driving speeds. Conversely, during reversing, e.g. during parking maneuvers or during reverse approaching of a truck or van to a loading ramp, the second region (i.e. the downward-directed region) may be displayed larger than the first region, i.e. the horizontally backward-directed region.

According to a preferred embodiment, the downward-directed capturing portion has a larger distortion than the backward-directed capturing portion. This has the advantageous effect that an exact, sharp and substantially undistorted image of the backward-directed capturing region (horizon view) is presented to the driver, as this image is indispensable for correctly estimating distance and speed of vehicles from behind, as well as for recognizing comparatively small objects in the distance. In the close range, however, the image may be distorted, as in driving situations where the close range is decisive (e.g. during parking maneuvers), firstly, the driving speed is low and, secondly, it may be easier for the driver to recognize and interpret distortions and the objects are larger due to their proximity, anyway.

According to a preferred embodiment, in the visual system, the size of the first and second extracted region is adapted dependent of the driving direction and/or the driving speed. Here, e.g. during parking maneuvers of the vehicle or during reverse approaching of a truck or van to a loading ramp, the second region (i.e. the downward-directed region) may be extracted larger than during forward driving of the vehicle. Adapting the size means that the illustrated region is made larger or smaller, i.e. constitutes a field of vision having a larger or smaller opening angle.

According to a preferred embodiment, the first and second images are sub-portions of the capturing portions that do not merge into each other. Consequently, a transition region located between the backward-directed capturing region and the downward-directed capturing region and containing information that is not relevant for steering the vehicle, is not shown to the driver. Thus, it is avoided to reproduce information that is irrelevant for the driver.

According to a preferred embodiment, in the display unit, the first image is displayed in the upper portion and the second image is displayed in the lower image portion in a separate manner. This facilitates understanding of the information displayed to the driver. The separate display of the first and second images means that in a display with seamless transition of the images in the display unit, the different illustrated capturing or image portions are automatically generated and recognizable, as the illustrated image is not continuous in this region. Rather, two images whose edges do not merge with one another are positioned directly adjacent to each other, so that the two images can be identified as separate images. For the sake of comprehensibility, a separating mark, e.g. a bar or line may be provided between the images. A line for separating the display may also be used in the case where the backward-directed capturing portion and the downward-directed capturing portion merge seamlessly. If the transition of the capturing portions is not seamless, a transition capturing portion may generate a separation of the first and second images, e.g. by a black image portion in the display unit.

According to an advantageous embodiment, in the display unit, the first image is displayed in the upper image portion, the second image is displayed in the lower image portion, and a third image is displayed in a central image portion, wherein the third image corresponds to the transition capturing portion located between the backward-directed capturing portion and the downward-directed capturing portion and respectively adjacent thereto. Thus, the driver gets a full view of the entire region behind the vehicle.

According to a preferred embodiment, the backward-directed capturing portion is directly adjacent to the downward-directed capturing portion, i.e. a capturing angle γ of the transition capturing portion corresponds to 0°. Here, an illustration of the central image portion, i.e. the third image, is omitted, which simplifies the interpretation of the entire image portion for the driver.

According to a preferred embodiment, the downward-directed capturing portion comprises a vehicle reference, preferably a rear edge of the vehicle. This particularly simplifies estimation of distances between the vehicle and obstacles during reverse driving. Alternatively, a rear edge of the vehicle may also be displayed as virtual image on the second image, which illustrates the downward-directed capturing portion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is explained in an exemplary manner by means of the attached figures, wherein.

DETAILED DESCRIPTION OF THE PRESENTLY PREFERRED EMBODIMENTS

Figure 1:
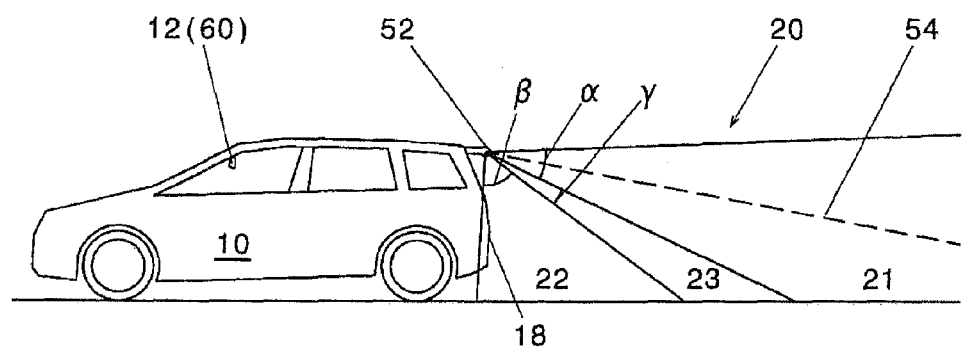
FIG. 1 shows a vehicle provided with a visual system according to one embodiment of the invention.
Figure 2:
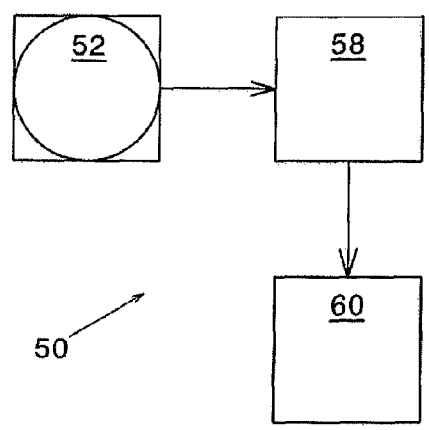
FIG. 2 is a schematic view of the visual system according to the invention.

FIGS. 1 and 2 show a vehicle 10 provided with a visual system 50 according to the invention, for viewing the region 20 behind the vehicle 10. Apart from the illustrated vehicle 10, the viewing system 50 may be advantageously used in commercial vehicles where a direct view from the driver's cabin to the region 20 behind the vehicle is usually impossible.

Visual system 50 comprises a capturing unit with a single capturing device 52, e.g. a camera or an image sensor, for acquiring and capturing the region 20 behind the vehicle. This region 20 includes a substantially backward-directed capturing region 21, a substantially downward-directed capturing region 22, and a transition capturing region 23 located between the backward-directed capturing region 21 and the downward directed capturing region 22, and respectively adjacent thereto. The backward-directed capturing region 21 has a horizon view, and the downward-directed capturing region 22 may be regarded as close up view and preferably shows a bumper of the vehicle.

As shown in FIG. 1, the capturing device 52 is adapted to acquire the three different capturing regions 21, 22, 23, which is realized, for example, by means of a wide-angle camera. In a capturing unit of this type, an opening angle of the camera with regard to the vertical axis may be in a range of 70° to 120°, dependent on the arrangement of the camera or the capturing device 52 on the vehicle. Further, an opening angle of the camera with regard to the horizontal axis of this type of capturing device may be in a range of 70° to 160°. With regard to the vertical axis, the capturing angle (opening angle) α of the capturing region 21 is in the range of 15° to 60°, and the capturing angle β of the capturing region 22 is in the range of 30° to 90°. The capturing angle γ of the transition capturing region 23 is in the range of 0° to 60°, i.e. when the capturing angle γ is 0°, capturing portion 21 and capturing portion 22 merge seamlessly. Dependent on the respective capturing angles, capturing portion 22 may acquire a distance between 2 and 10 meters with regard to the road in driving direction, wherein the preferred region is a region between 2 and 5 meters, and capturing portion 21, with regard to the road in driving direction, may acquire a distance starting at about 10 meters or more behind the vehicle. Further, the capturing angle β of the capturing portion 22 may be chosen such that it includes a vehicle reference, e.g. a rear edge 18 of the vehicle 10.

The visual system 50 further comprises an image processing unit 58 where the data of the capturing unit is entered. The image processing unit 58 or calculation unit, respectively, then processes the image generated by capturing device 52, which includes the backward-directed capturing portion 21, the downward-directed capturing portion 22, and the omitted portion 23.

Figure 3:
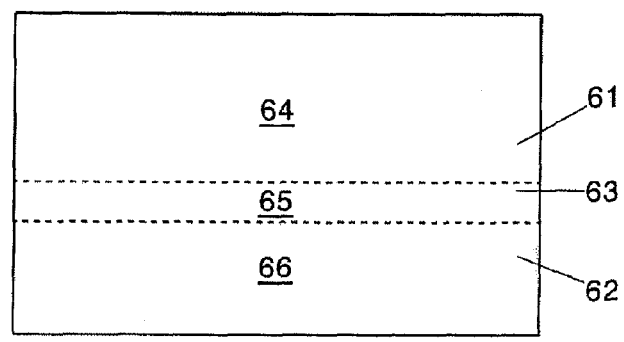
FIG. 3 is a schematic view of a display unit of the visual system.

With reference to FIG. 3, processing in the calculation unit 58 is carried out such that three images 61, 62, 63 are generated, which images can be displayed in a display unit 60 that is part of the visual system 50. On the display unit 60, there is an upper image portion 64, a central image portion 65, and a lower image portion 66. In the upper image portion 64, the first image 61, which corresponds to the backward-directed capturing portion (horizon view) 21, is displayed. In the central image portion 65, the third image, which corresponds to the transition capturing portion 23, is displayed. In the lower image portion 66, the second image 62, which corresponds to the downward-directed capturing portion (close-up view) 22, is displayed. By seamlessly displaying the three images 61, 63, 62 in the respective image portions 64, 65, 66, the driver is shown the entire acquired capturing portion.

Alternatively, the image portions 64, 66 may also be displayed separately, i.e. the central image portion 65 or the third image 63, respectively, are not illustrated. Here, either the capturing angle γ of the transition capturing portion 23 may be chosen such that it is 0°. Then, capturing portion 21 merges seamlessly with capturing portion 22, i.e. a transition portion 23 does not exist. Or the display of an existing transition capturing portion 23, i.e. the third image 63 or the central image portion 65, which is not relevant for driving situations, is omitted, so that a display of information that is unnecessary for the driver is avoided. In case of an existing transition capturing portion 23, separation of the image portions 64, 66 or the first and second image 61, 62, respectively, is thus either based on the respective different depictions of the images per se, which may additionally be separated, for example by a black line, or the central image portion 65 may be blacked out.

The calculation unit 58 may be arranged anywhere within the vehicle. It may, for example, be formed integrally with the capturing unit or with the display unit 60.

As shown in FIG. 1, the screen of the display unit 60 is preferably mounted such within the vehicle at a position where usually a conventional rear-view mirror is located, that it is located on the 95$^{th}$ percentile of the Frankfurt horizontal plane (German horizontal plane, i.e. the virtual line that connects the inferior margin of the orbit with the highest point of the ear) or higher. Hence, ergonomic conditions will be provided for a driver, as he can orientate himself with regard to a conventional position of an inside rear-view mirror 12 in a vehicle, and is provided with the same image he would see when looking back by means of the inside mirror of the vehicle.

The screen or display or the projection surface or the like of the display unit 60 is preferably arranged within the driver's cabin or the vehicle 10, and adjustable around a pivot point, so that the driver may fine-adjust an easily visible position with regard to his individual eye point.

The display unit 60 may be a monitor having a respective screen or display. The display unit 60 is, however, not limited thereto, and may also be a projection on interior vehicle body components.

The capturing device 52 (camera 52) is attached to a rear portion of the vehicle, preferably at the upper edge, as shown in FIG. 1, and aligned substantially horizontally towards the rear.

The capturing device 52 (camera 52) comprises an optical lens, whose optical axis 54 is located substantially in the center of the backward-directed capturing portion 21 and thus corresponds to the bisector of the capturing angle α/2 shown in FIG. 1. Typically, in wide angle lenses having a large image angle, spherical aberration occurs at the edge portions of the acquired image angle. When using a "conventional" lens, i.e. a spherical lens, distortions in the horizon view portion may occur, and it may be hard for a driver to recognize distant objects. Due to the fact that the optical axis is substantially arranged in the center or the backward-directed capturing portion 21, this portion can be displayed substantially undistorted, which allows for correct estimation of distance and speed of vehicles from the rear, and also distant objects are clearly visible.

Alternatively, the capturing device or camera 52 comprises an aspherical lens. An aspherical lens is a lens whose optically effective shape deviates from a spherical shape. By an aspherical lens, in particular the above mentioned spherical aberration may be corrected, which mainly occurs in edge portions of the acquired image angle, i.e. in the present case the downward-directed capturing portion 22. By means of the aspherical lens, said distortions are rectified and the driver is provided with a readily understandable image of the downward-directed capturing portion 22 (region of the blind spot), which image is enhanced with regard to possible irritations.

The backward-directed capturing portion 21 substantially corresponds to the depiction on an inside rear view mirror. As this backward-directed capturing portion 21 is arranged in the upper image portion 64 of the display unit 60, it is easier for the driver to readily understand the illustrated image.

In the embodiment, the visual system 50 dynamically adapts the respective size or the illustrated portion of the respective images shown in the upper image portion 64 and the lower image portion 66 of the display 60 to the respective driving situation. Dynamic adaption is carried out both dependent on the driving speed and the driving direction, i.e. forward driving and reversing. Hence, when driving forward and at high driving speed, the section of the capturing portion illustrated in the first image 61 is smaller than it is during forward driving at low speed, as the region that is most interesting during fast driving is closer to the horizon. However, when reversing, i.e. during parking maneuvers of the vehicle 10, or when driving a truck or van reversely towards a loading ramp or the like, the section of the capturing portion illustrated in the second image 62 is larger than during forward driving. Here, the opening angles α, β may be chosen such that capturing portions 21, 22 merge seamlessly (i.e. a transition capturing portion 23 does not exist). This means that the opening angles α, β of the respective capturing portions 21, 22 for the illustrated images 61, 62 vary, and the capturing angle γ of the transition capturing portion 23 is also varied. At a capturing angle γ=0, it may be advantageous to arrange a separating border, as already described above, between the images 61, 62.

Additionally, the optical axis 54 may be arranged in a substantially central position in the downward-directed capturing portion 22, e.g. by pivoting capturing device 52, so that it corresponds to the bisector of the capturing angle β/2 shown in FIG. 1, in order to achieve a rectified depiction of capturing portion 22.

Alternatively or additionally, also the dimensions of the upper image portion 64 and the lower image portion 66 are correspondingly varied, i.e., for example during forward driving, the upper image portion 64 is displayed larger on the display unit 60 than during reverse driving and/or than the lower image portion 66. During reverse driving, the lower image portion 66 is displayed correspondingly larger than during forward driving and/or than the upper image portion 66. Correspondingly, also the central image portion 65, if it is displayed at all (dependent on whether an existing transition capturing portion 23 is illustrated), may be varied.

Hence, the visual system adjusts the dimension of the first and second extracted portion dependent on the driving direction and/or the driving speed. That is, the visual system may choose capturing angle α of capturing portion 21, capturing angle β of capturing portion 22, and capturing angle γ of transition capturing portion 23 respectively corresponding to one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A visual system for a vehicle, comprising:
a capturing unit mounted to the vehicle and provided with at least one capturing device,
a calculation unit; and
a display unit;
wherein the capturing device is adapted to acquire a capturing region behind the vehicle, said region including at least one undistorted backward-directed capturing portion behind the vehicle, which portion is directed backward, and a downward-directed capturing portion behind the vehicle, which portion is directed downward,
wherein the visual system is adapted to extract a first image from the undistorted backward-directed capturing portion, which first image corresponds to the undistorted backward-directed capturing portion, and a second image, which corresponds to the downward-directed capturing portion, and to display the first image in an upper image portion and the second image in a lower image portion on the display unit,
wherein the visual system adapts the size of the first and second extracted images by adjusting a capturing angle in the vertical direction in dependence upon the driving direction and/or the driving speed,
wherein the downward-directed capturing portion shows more distortion than the backward-directed capturing portion, and
wherein, when the vehicle is driving in reverse direction, the lower image portion is larger than in a case when the vehicle is driving in forward direction and, when the vehicle is driving in a forward direction, the upper image portion is correspondingly larger than it is in a case when the vehicle is driving in reverse direction.

2. The visual system according to claim 1, wherein the undistorted backward-directed capturing portion corresponds to a horizontal view.

3. The visual system according to claim 1, wherein the capturing device comprises a lens.

4. The visual system according to claim 1, wherein the capturing device comprises an aspherical lens.

5. The visual system according to claim 1, wherein the capturing device is a single camera.

6. The visual system according to claim 1, wherein the undistorted portion, which is directed backward, replicates an image on an inside rear view mirror of the vehicle.

7. The visual system according to claim 1, wherein the display unit is arranged inside the vehicle in the area of a conventional inside rear view mirror.

8. The visual system according to claim 1, wherein the calculation unit extracts the first and second images from the capturing portion.

9. The visual system according to claim 1, wherein the first image and the second image are sub-portions of the capturing portion, which sub-portions do not merge.

10. The visual system according to claim 1, wherein the display unit displays the first image in the upper image portion and the second image in the lower image portion, separate from each other.

11. The visual system according to claim 1, wherein the display unit displays the first image in the upper image portion, the second image in the lower image portion, and a third image in a central image portion, wherein the third image corresponds to a transitional capturing portion that is located between and adjacent to the backward-directed capturing portion and the downward-directed capturing portion.

12. The visual system according to claim 1, wherein the backward-directed capturing portion is directly adjacent to the downward-directed capturing portion.

13. The visual system according to claim 1, wherein the downward-directed capturing portion corresponds to a portion of the vehicle comprising a rear edge of the vehicle or a bumper of the vehicle.

* * * * *